United States Patent [19]

Heifetz et al.

[11] 3,857,476

[45] Dec. 31, 1974

[54] HELICAL ENDLESS-BELT MECHANISMS FOR FUEL OR EMPTY DISHTRAY TRANSPORTING AND LIFTING

[75] Inventors: Sidney T. Heifetz, New York, N.Y.; George Ran, Fort Lee, N.J.

[73] Assignee: Theodore Equipment Corporation, Wood-Ridge, N.J.

[22] Filed: Jan. 29, 1973

[21] Appl. No.: 327,417

[52] U.S. Cl. ................................. 198/136, 198/195
[51] Int. Cl. .......................................... B65g 17/06
[58] Field of Search ........... 198/136, 137, 195, 170, 198/196, 181, 182, 189

[56] References Cited
UNITED STATES PATENTS

| | | | |
|---|---|---|---|
| 701,459 | 6/1902 | Aston | 198/136 |
| 2,045,912 | 6/1936 | Howison | 198/195 |
| 3,225,898 | 12/1965 | Roinestad | 198/189 |
| 3,545,597 | 9/1968 | Resener | 198/195 |
| 3,595,380 | 7/1971 | Miller | 198/195 |
| 3,627,109 | 12/1971 | Cabak | 198/137 |
| 3,669,247 | 6/1972 | Pulver | 198/189 |
| 3,708,059 | 1/1973 | Ackermann | 198/189 |
| 3,742,863 | 7/1973 | Rosenberger | 198/189 |

FOREIGN PATENTS OR APPLICATIONS

| | | | |
|---|---|---|---|
| 723,469 | 12/1965 | Canada | 198/195 |

*Primary Examiner*—James B. Marbert
*Assistant Examiner*—Richard K. Thomson

[57] ABSTRACT

The conveyor has a pliable endless belt adapted to negotiate a multiplicity of helical convolutions in a non-planar or twisted mode, and is also adapted to negotiate straight runs tangentially continuing with the helical rungs, with the belt in the straight runs operating in a flat planal untwisted mode. The belt is composed of a link-type chain having pins and rollers with tolerances among the component operating parts as to provide extension and contraction capabilities and of chain-connected separate and independent slats, supported by fixed helical track bars substantially at the mid-length of the slats, leaving the free ends of the slats free to flex toward conformity with flat-bottomed objects transported, whereby slack is introduced in each convolution to prevent snubbing or binding. A sprocket wheel engages the chain at substantially each convolution. A common driving means permits these sprockets to turn only in unison. The slats are adapted to and carry the chain at their mid-length and between the track bars. The slats slidably engage the track bars in a manner that prevents any substantial lateral or uplift movement of the slats but steer-wandering and creep-jogging are not inhibited. The sprocket wheels are set with slack chain between them. The slack is obtained from the aggregate of the clearances among the component parts of the chain, and less than the accumulative total per convolution of clearances between adjacent sprockets to prevent crowding the outer track bar or choking the inner track bar. Where high inclines of travel runs are required, or where spaced-phased travel of conveyed objects is required, positive pusher means may be incorporated on spaced slats whereby such operation is effectuated with high facility.

9 Claims, 11 Drawing Figures

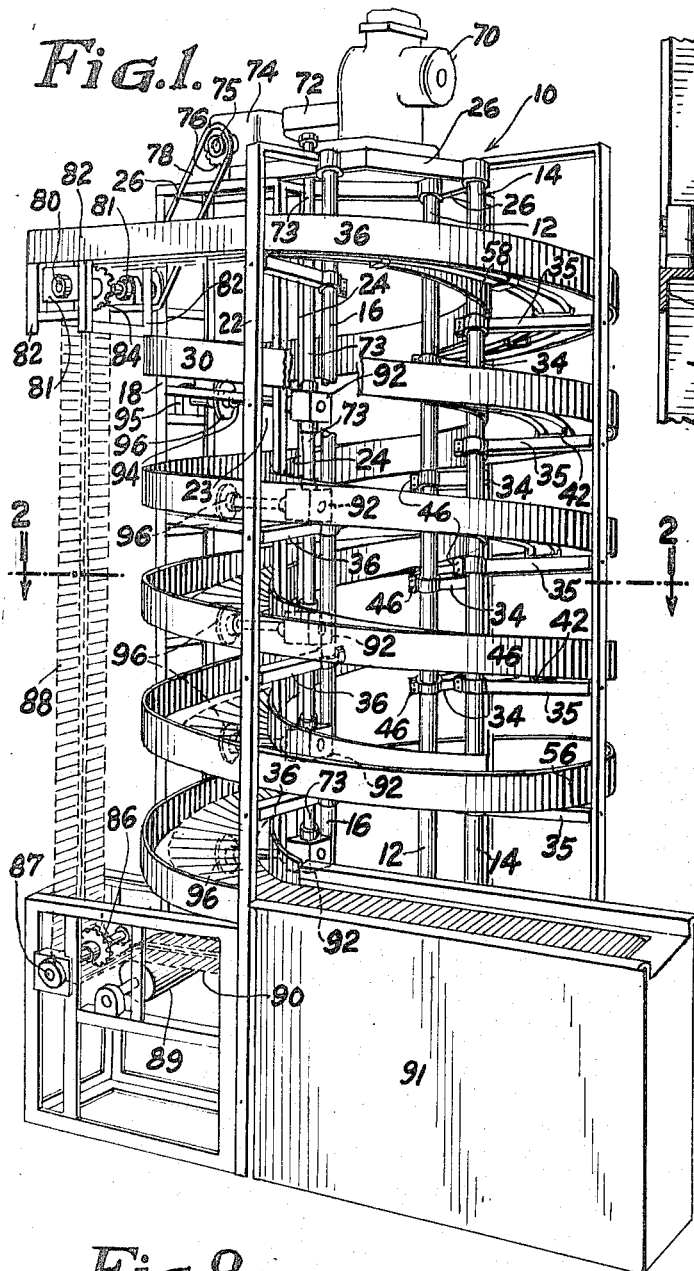
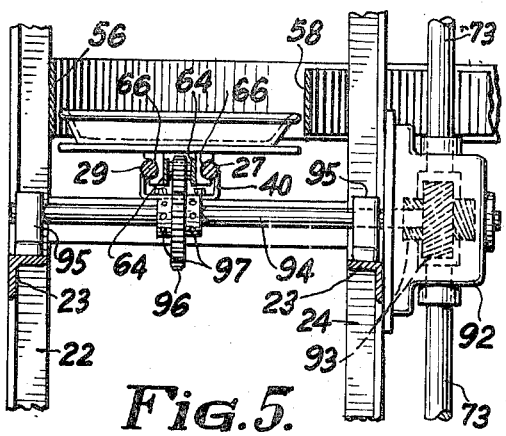
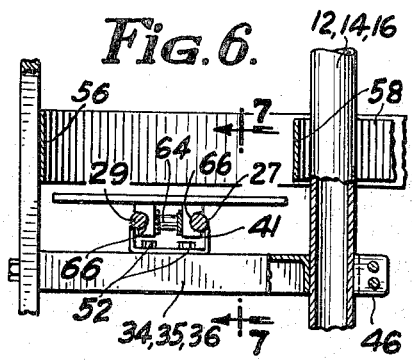
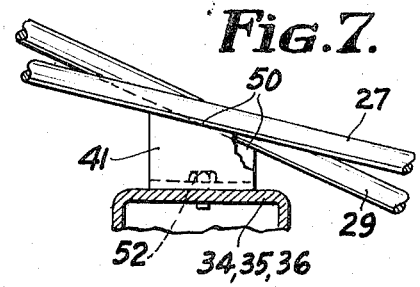
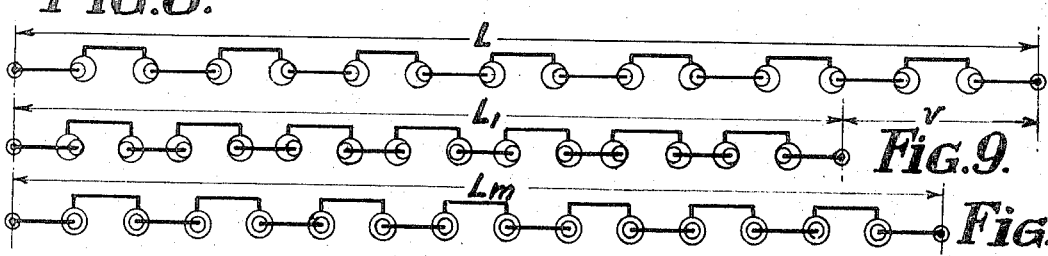
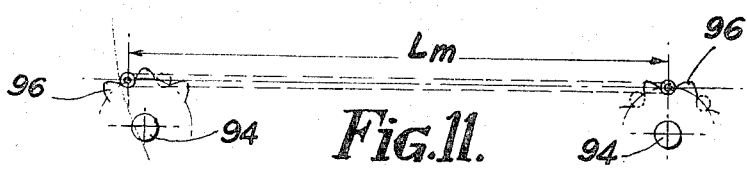

3,857,476

HELICAL ENDLESS-BELT MECHANISMS FOR FUEL OR EMPTY DISHTRAY TRANSPORTING AND LIFTING

This invention relates to endless-belt conveyor apparatus construction and mechanism adapted to transport in a smooth and uninterruptedly continuous-moving manner, mainly in a helical path and in its tangentially contiguous paths, substantially flat-bottomed objects on the belt such as a trayful of dishes.

More particularly this invention relates to such conveyors employing endless belts including independent slats adapted to handle empty and loaded food trays, tote boxes and the like in random tandem fashion or in space-phased relationship at helical inclines and curves and through inclined straight and horizontally straight continuing extensions thereof.

Still more particularly, this invention relates to such endless-belt conveyor apparatus of the above mentioned character that includes a multiple-convoluted helical path in its course of travel and sliding supports and guideways for said belt without snubbing or accumulative frictional dragging or wander-steering effect between the slats and their slide supporting guides.

Further, this invention relates to the construction and combination of a unitary, endless, slatted, chain-belt with its sliding supporting structure and the driving and advancing-control mechanism.

Most particularly, this invention relates to such above mentioned conveyors that employ chain of the sprocket-driveable character and of the type that is capable of bowing and twisting.

Other particulars related to the invention will appear in the following specification.

On prior slat-belted helical conveyors employing rigid end-supported slats, such belts present inherently rigid, twisted surfaces for reception and movement of conveyed objects and therefor, flat-bottomed objects totter upon such belts. Where such end supports are at intervally spaced slats, longitudinal bowing and coincidental shortening of the belt length occurs especially under heavy loads which induces chattering and other objectionable operating conditions. During tottering the inner and outer edges of the slats are alternately dragged along their respective rails which causes steer-wandering which is comparable to a vehicle that is steered first to one side of the road and then to the other, repeatedly.

In other prior devices where helical guideways or tracks are of square or angle-bar, or other quad-angular-shaped cross-section, the formation of a pair of helixes of precise dimension, one within the other, mitigates against the attainment of precise, low lateral and vertical clearances, between the belt and its guideways, necessary to prevent binding, chattering and other malfunctioning attributes.

Other prior helical conveyor devices have their belts pulled around a central core or around a helical sliding supportway or tracks. This requires complicated tension-sensitive mechanism to prevent accumulative frictional dragging and/or serpentine choking and eventual fatal snubbing of the belt around, or within, its central supporting core.

Still other prior devices purporting to do what this present invention accomplishes are too costly, cumbersome, inefficient and unreliable in many particulars, some of which will be hereinafter pointed out.

It is one of the principal objects of the invention to provide a simple conveyor apparatus for moving substantially flat bottomed objects of the character described above, along and throughout a series of continuing paths that include a multi-convoluted helical path with tangential other paths of other conformation including straight paths, in a smooth uninterrupted and abruptless direction-changing manner.

Another object is to provide a novel, flexible and twistable sprocket-chain type of endless belt adapted to negotiate a relatively small diameter helical path and to negotiate a variety of curves and turns as well as continuing straightways at inclines or horizontal straightways in a continuing and tangential manner.

A further object of the invention is to provide a conveyor mechanism of the above character that has a novel unitary and coordinated drive arrangement which prohibits helical snubbing.

One of the novelties of the invention is the provision of a series of chain-connected slats, each successively supported, substantially at their midsection, by an underlying pair of parallel helical track rods for close and firm, yet controllably slidable support for each of the slats, leaving their ends substantially free to flex to conform with flat planal trays and the like, particularly at normally twisted non-planal surface along a helical path.

Other objects and advantages are contemplated, some of which will be specifically mentioned, while others will become apparent in the following description having reference to the accompanying drawings showing a preferred form of the invention; in which:

FIG. 1 is a perspective view of a preferred form of the invention showing a helical type conveyor unit with a relatively short horizontal at the top and at the bottom of a multi-convoluted helical run.

FIG. 5 is a view taken along line 5—5 of FIG. 2 showing the driving components for a convoluted portion of the chain belt.

FIG. 6 is a view taken along line 6—6 of FIG. 2 showing the track supporting and sliding components of the belt.

FIG. 7 is a fragmentary view taken along the line 7—7 of FIG. 6 showing the inner and outer track rail relationship with respect to their supporting clip.

FIG. 8 is a schematic view of a length of chain of the roller and pin-link type in its extended position.

FIG. 9 is a similar view showing the length of chain of FIG. 8 in its contracted position.

FIG. 10 is a similar view showing the same length of chain in its substantially mean or substantially operating length or condition of length.

FIG. 11 is a schematic view of a length of chain showing the disposition of links in the course of passage across two sprocket driving points.

Figure 2:
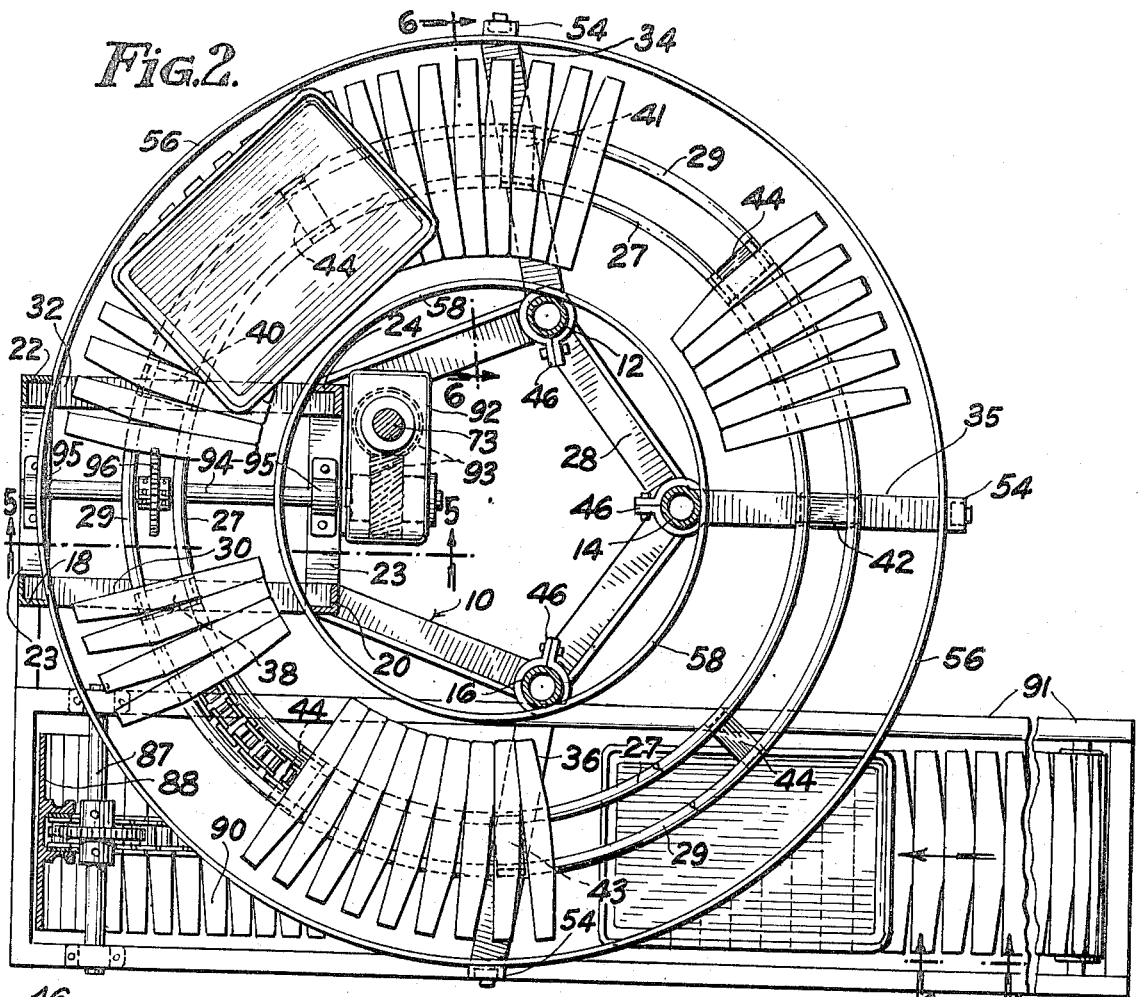
FIG. 2 is a plan view taken along the line 2—2 of FIG. 1 looking in the direction of the arrows and down upon some of the helical convolutions and the straight bottom horizontal run.

Referring now to the drawings, particularly to FIGS. 1 and 2, the numeral 10 designates the structure in general comprising a plurality of upright members 12, 14, and 16, preferably of tubular cross section, and a plurality of uprights 18, 20, 22 and 24, of structural angle shape. These upright members are held together in their positions shown by horizontal structural beam members 26 at their top and by similar horizontal structural members 28 at their bottoms. These members forming the structure 10 in general are suitably joined together as by welding to form a rigid framework. These members may be of any other suitable shapes and cross sections and may be otherwise suitably attached as part of the total framework.

The three tubular upright members 12, 14 and 16, and the two angle uprights 20 and 24 are in plan view disposed within the circularly embraced confines of the helical pathway of the conveyor belt of the apparatus. The two angle uprights 18 and 22 are disposed outside this helical pathway. The course of this helical pathway is prescribed by the pair of side-by-side, inner and outer, parallel track bars 27 and 29 respectively. The several convolutions of the track bars pass between the inner and outer pairs of uprights 18 and 20, and 22 and 24, as is clearly seen in FIG. 2, and further described hereinafter.

A vertical series of horizontal wrung-like members span at 30 the uprights 18 and 20 and similar wrung-like members 32 span the vertical upright angle members 22 and 24 but at higher levels. The difference in levels is of course dependent of the inclination of the basic helical pitch of the particular unit involved. This difference in levels is of course also dependent upon the distance between sucessive horizontal wrungs 30 and 32. This difference in levels is precisely known and is easily precisely maintainable in the course of fabrication of the supporting structure. The parallel track rods are adapted to be supported by these wrung-like members at points where they intersect and the elevations of the rungs are such as to provide for intervening, spaced "U" shaped clips 38 and 40, at each intersection.

Substantially radiating from the tubular uprights 12, 14 and 16, each at different levels conforming to the basic pitch of the helix involved, are support arms 34, 35 and 36 adapted to support clips 41, 42 and 43 respectively. Intermediate spanner clips are similar to the previously mentioned clips except that no underlying supports are at these clip points; they merely hold the track bars in proper parallel position with respect to each other. However, supports may be provided under the clips 44 to reduce the load span where conveyed objects are heavy.

The support arms 34, 35 and 36 are provided with tubular clamp means at their inner ends which are capable of firmly gripping in an adjustable manner around the tubular uprights 12, 14 and 16. By this means the proper elevational support and positioning of the helical track bars is achieved. The clamp means are generally designated as 46.

In the course of assembly of the track rods onto and into the structure 10, the track rods are first temporarily tacked to each other at substantially proper spaced relationship, concentricity and pitch relationship, whereupon, this sub-assembly is threaded into position where the track rods overlie the wrungs and the radiating supports. The clips are then made secure to the rods and then the clips are made secure to the rungs and to the radiating support arms after they have been set to proper elevations. The intermediary clips are then welded to the track rods. The sequence may be altered somewhat for expediancy and finally, all temporary tacking is removed.

In preparation of some of the elements of the assembly and sub-assemblies, particularly in the fabrication of the track rods per se, these may be coiled without necessarily attaining their ultimately precise helical pitch form. This is of course assuming that in their initial coiled stage, that their respective diameters will in their final disposition produce helical diameters with respect to each other and their parallelism as to provide close tolerance trackways to a minimum of lateral freedom. The slats being molded and, since even commercial rods are readily obtainable in close tolerance diameters, a minimum of vertical freedom of the slats is achievable.

Referring particularly to FIGS. 6 and 7, it is to be noted that the upper edges of of the legs of the clips, here designated as 41, are of different angularity. This is to match the differing angularity existing between the inner and outer helical track rods. These angularities are readily anticipated and the clips are therefor easily made readily adaptable for in-situ welding and securement as at 50 and 52, FIG. 7.

In order to reinforce the load-carrying capacity of the radiating arms 34, 35 and 36, risers 54 are secured to their free ends. These risers are framed at their tops to the structural members 26. These risers also serve as retaining means for an outer helical guard plate 56, as do the risers 18 and 22, see FIG. 2. An inner guard plate 58 is retained by the tubular risers 12, 14 and 16 together with the uprights 20 and 24. These helical guard plates are disposed on either side of pathway of the belt and may, as in the instant illustrated form of the invention, extend tangentially from the end of its helical conformation, as shown at the top of FIG. 1. Similar extentions along the bottom of the structure can easily be provided where desired.

Figure 3:
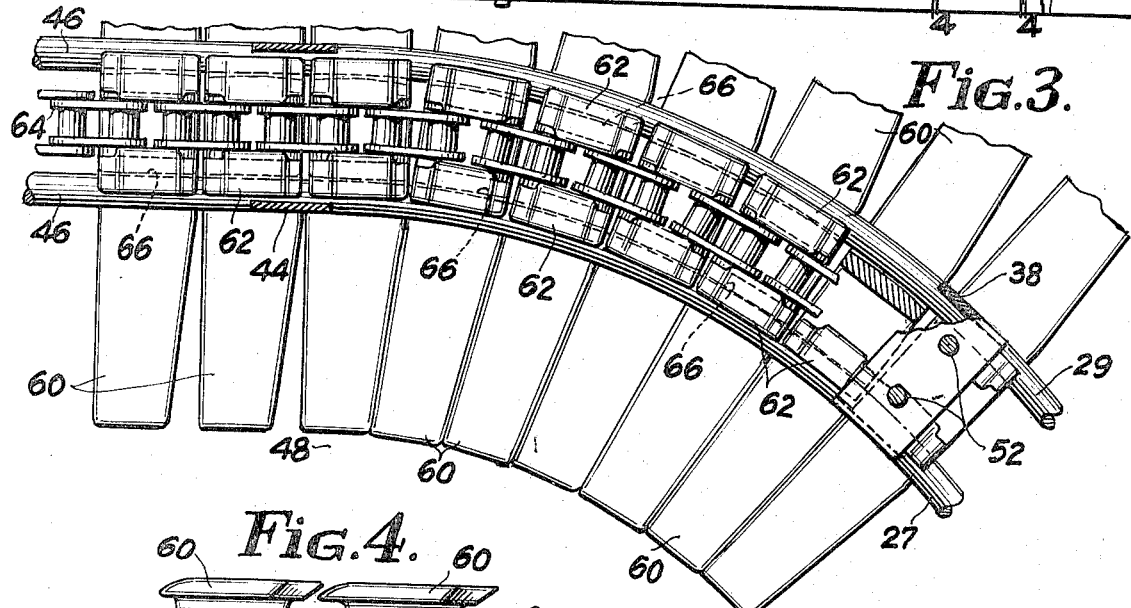
FIG. 3 is a fragmentary bottom view of a portion of the belt, in its guides, at the juncture of the helical run and the tangential straight portion of the run.
Figure 4:
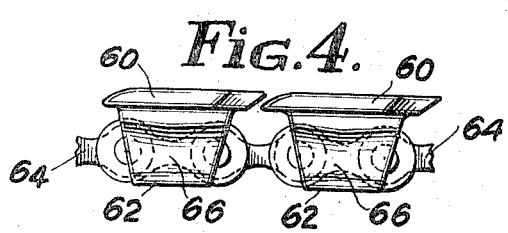
FIG. 4 is an end view of a fragment of chain, taken substantially along the line 4—4 of FIG. 2, showing the relative relationship of adjacent slats and their rail embracing recesses.

The slats generally designated as 59, are preferably moulded of plastic material of suitable high-flexible strength and rigidity, and of high lubricity. Each slat is composed of an elongated body with two depending lugs midway of its ends which are adapted to firmly clamp between them, the chain 64. The lugs are adapted to engage the outer links of the chain as is seen in FIGS. 3 and 4. The outer surfaces of the lugs are provided with semi-circular grooves 66 adapted to closely, but with minimal sliding clearance in operation, fit the contour of the round bars 27 and 29.

As seen in FIGS. 2 and 3, the plan outline of the slat body is slightly widest in the middle, and narrows wing-like toward its free ends, so as to be able to accomodate their space requirement on the inside track end upon negotiating a turn without overlapping interference. On turns the ends of the slats on the outside track are naturally spread accordingly. The pitch of the slats at their middle is of course maintained by pitch of the links of the chain.

With respect to the operation of the composite conveyor belt, and particulary with the contact action of the slats upon trays and other flat bottomed objects, it can be realized that during such object's travel from shown straight path onto a turn path the objects would sense a frictional "fanning" of the slats as it progressively takes place against its nether surface. Inasmuch as there is as much "fanning" in as there is "fanning" out, the net effect does not cause any great consequential reaction during the transition from a straight travel path to a curved travel path and vice-versa.

Referring now mainly to FIG. 1, the apparatus is provided with a motor on top of the framework 26. This motor 70 is the main source of power for moving the chain through the several travel paths of the apparatus. Through the transmission mechanisms inside the casings 72 and 74, a vertical shaft 73 projects downward from the former and a horizontal shaft 75 issues from the latter. Attached to the shaft 75 is a sprocket 76, which through a chain 78 drives a horizontal shaft 80 located along the top side of the angle framework upright 18. This shaft 80 is suitably supported in bearings 81 carried by supplementary framework 82 forming part of the upper horizontal travel path structure.

Inboard of the shaft 80 is a sprocket 84, around which the conveyor belt chain is trained and driven. An idler chain-take-up mechanism, including a sprocket 86 on shaft 87, is disposed below the sprocket 84 to provide the vertical run of the belt as at 88 and to train the run in a horizontal path as at 90 over an idler roll 89. The horizontal run 90 passes into a tray make-up box 91 which contains belt washing and belt return mechanism well known in the tray conveyor art and therefor not shown or described except to state that tray or box objects are generally made up or start their journey from atop this box.

The shaft 73 passes through the several vertically disposed transmission casings 92, one at each level of the several convolutions of the helical pathway of the belt and substantially under the belt at these areas. As seen in FIG. 5, a pair of helical gears 93 inside the casing provides a horizontally emerging drive shaft 94, in journals 95, at each of these levels. This shaft 94 is supported on cross rungs 23 at each of these levels which are supported by pairs of uprights 18, 22 and 20, 24, respectively. A sprocket 96, inboard of the journals 95, and disposed underneath the belt is in close root-engagement with the rollers of the chain 64, leaves a minimum of vertical clearance and therefor results in a minimal tendency of the generally involute tapering form of chain sprocket teeth to lift the chain in the course of driving same during operation.

As seen in FIG. 1, the topmost drive sprocket 96 is disposed at substantially three-quarters of a revolution downstream of the topmost straight horizontal run, and the preceeding upstream drive sprockets 96 are one convolution apart; the last and lowest, occuring at one-quarter of a revolution from the horizontal make-up run over the make-up box 91. For the sake of clarity all the elements of these vertically disposed drive assemblies are not shown in FIG. 1, they being the same as that disclosed in detail in FIG. 5.

In order to clearly understand the frictionally responsive effects that take place in the operation of helical conveyor belts of the character involved, attention is directed to to FIGS. 8 to 11. The length variations discussed below apply to similarly usable link chain that are in general composed of elements in its composition that vary according to and within the vageries of their dimensional tolerances of manufacture, the aggregate of which affects the total length of chain with respect to the length of the track per convolution. This length is also subject to variation due to the vagaries in dimensional tolerances in the rolling and other course of manufacture of the track bars. Where the concomitant variations in length of chain and length of track mitigate in a particular convolution between driving points as determined by the fixed locations of their respective shafts, the mere elongation of the chain as at L in FIG. 8, or the compressing of it as at $L_l$ in FIG. 9, could result in seizure of the slats against the outer track bar if an overlong section of chain is required to traverse a short convoluted trackway, and particulary where a underlengthed chain is extended in tension and is required to traverse a choked inner track bar.

In one convolution of say, a radius of 18 inches of ¾ inch pitch links the variation in chain length $v$, FIG. 9, is relatively small as compared to the variation differences in track length among the several convolutions, and therefor, a given chain length that may operate in one convolution may be totally inoperative in another where sprockets are alined and keyed or fixed to their shafts.

At installation the chain of the belt is first trained around the sprocket 84 at the end of the upper horizontal run, see FIG. 1. Then, set screws 97 in the hub of sprockets 96 are loosened so as to permit the free meshing of the chain as the belt is threaded along the tracks, around and down the several convolutions, in turn engaging the series of sprockets, each loose upon their respective shaft 92. The belt is then threaded through the make-up box 91, over the idler roll 89, under the take-up sprocket 86, then up to join with the free end of the chain near sprocket 84.

Starting with the uppermost sprocket 96, this is made fast to its shaft by tightening its set screws 99. With the chain in the disposition $L_m$, mean length, as shown in FIG. 10, the rotational position of the next lower sprocket is dictated and in this position, this next set of set screws are made fast to the shaft. By continuing in this manner the precise disposition of each sprocket is established regardless of the vagaries of length of the coacting components. FIG. 11 illustrates this by the shown disorientation of representative adjacent sprockets with respect to their driving shaft distances or driving point distances. This rotative positioning of the sprockets around their shaft is critical with respect to the lateral clearance on both sides of the slat grooves 66. At assembly it has been found desireable to adjust the sprockets to positions where, without overextending the chain, the slats lightly bear against the inner track bar. This leaves lateral space for the elongation of the chain due to wear, without risk of rubbing on the outer track bar.

Each unit length of chain that is fitted at its mean length $L_m$ between its respective sprockets contains its own fitted number of links and fractions thereof. In operation, with the sprockets turning in unison, as one link is fed into a particular unit length of a convolution, a link at the upstream sprocket is fed out, therefor preventing any increase or decrease of chain length of that or any other length of other respective lengths unit. The chain and slats are confined to move in unison, tooth for tooth and slat for slat throughout the helical path except for slight "dress" shifting within the limits $v$ under the influence of the load of the objects conveyed or other gravitational influences. This can be realized by the fact that an object in passing a sprocket its slats tend to hang back thus crowding those between it and the passed sprocket into the $L_l$ condition. As the object approaches a sprocket the upstream links and slats are attenuated in the L mode, all without any accumulative effect of one convolution upon another.

Where a helical path of steep slope is desired that requires the need for positive pusher bars or cleats, these are usually provided on slats at spaced intervals as great or greater than the length of the objects. The total chain length is of such length to be of a finite multiple of the spaced lengths required for the individual objects. The addition or subtraction of links to produce such commensurate length of chain is accomodated by raising or lowering the position of the take-up sprocket 86.

Having thus described the invention in detail construction and operation, it is evident that many modifications can be had in other similar forms without departing from the spirit of the invention expressed in the broadest permissible scope of the following allowed claims.

We claim:

1. In a multi-convoluted helical conveyor of the character described for transporting substantially flat-bottomed full or empty dishtrays, the combination of a supporting structure, a pair of helically-parallel track bars supported by said structure, a plurality of chain-driving sprockets, and an endless, slatted, link-chain belt comprised of a bowable and twistable link-chain, a plurality of separate, independent, free-ended, semi-flexible plastic slats, the free and deflectable ends of said slats extending transversely over and substantially beyond the track bars, said track bars disposed at an inclined angle not over the friction angle of the dishtrays upon the slats, said slats having integral, bifurcated chain-engaging and track bar engaging means at their mid-lengths to fixedly engage said chain and to slidably engage said track bars flanking said bifurcated means, said bifurcated means having outwardly directed and opposed recesses to snugly yet slidably fit said track bars, said recesses being in close sliding relationship with the upper, nether and inner surfaces of said track bars to prevent uplift, tilting and lateral shifting of the slats, said recesses being of maximum length as to minimize the orientative wandering of the slats during their travel under the influence of said sprockets, whereby loadless slats are confined to move sequentially in a twisted, ribbon-like non-planal mode and whereby the ends of deflected slats move in groups in supportive planal contact with transported dishtrays, such supportive slats being selectively independently flexed according to the weight disposition of any particular dishtray.

2. In a conveyor according to claim 1 wherein there is a vertically disposed drive shaft suitably attached to said structure, said shaft being connected to a plurality of rotative power take-off means each at a different level said power take-off means being connected to a sprocket engaged with said chain at its respective level.

3. In a conveyor according to claim 1 wherein the chain is of metal and capable of bowing and twisting.

4. In a conveyor according to claim 1 wherein the slats are of molded plastic material of substantial scuff resistance and of relatively high lubricity and stiffness yet flexible.

5. In a conveyor according to claim 1 wherein the chain in its extended condition is longer than in its compressed condition, and adjustable sprocket orienting means whereby the operating length of chain between sprockets is set to a distance within the said chain's extended and compressed lengths.

6. In a multi-convoluted helical conveyor of the character described for transporting substantially flat-bottomed dishtrays, the combination of a supporting structure, a pair of helically-parallel track bars comprised of an inner and outer track bars supported by said structure, said track bars being arranged in a plurality of identical convolutions, a slatted-chain belt composed of an endless link-chain of pin and roller character having inherent clearances in its component parts, permitting accumulative lengthwise extension or contraction, and a plurality of independent dishtray-supporting plastic slats, said slats having integral bifurcated depending means attaching said chain to said slats at their midlength, said track bars being disposed at an angle less than the friction angle between the dishtrays and the slats, said slats being slidably supported at points immediately outward of said depending means to provide maximum free length of the ends of the slats, at least three sprocket wheels of equal size engaging the link-chain at points one convolution apart, each pair of sprockets confining a length of chain equivalent to the length of the convolution of the track bars between the corresponding pair of sprockets, a unitary driving means having a common driving source for turning all sprockets in unison, and independent locking means on each sprocket for positioning adjacent sprockets to create a loose, untensioned and uncompressed length of chain between each pair of adjacent sprockets, whereby a positive slack is obtained and maintained from the aggregate of said clearances in the link-chain, and whereby frictional snubbing and frictional braking against the respective inner and outer track bars is prevented.

7. In a conveyor according to claim 6 wherein the slats are provided with a pair of of lugs depending from the nether side thereof and adapted to embracingly engage said link-chain between said lugs.

8. In a conveyor according to claim 6 wherein the said track bars are round in cross-section.

9. In a conveyor according to claim 7 wherein the said lugs are provided with semi-circular grooves on their outer surfaces which are adapted to be disposed between the track bars and facing outwardly and of such magnitude as to closely yet slidably fit between and around said track bars whereby lateral shift and uplift of the slats is minimal and steer-wandering and creep-jogging are prevented.

* * * * *